(12) United States Patent
Webber et al.

(10) Patent No.: US 7,063,348 B2
(45) Date of Patent: Jun. 20, 2006

(54) AIRBAG MODULE AND A METHOD FOR THE ATTACHING OF A GAS GENERATOR TO A GAS GENERATOR HOLDER

(75) Inventors: James Lloyd Webber, Shelby Township, MI (US); Sabina Asic, Wuppertal (DE)

(73) Assignee: Delphi Technologies, Inc., Troy, MI (US)

( * ) Notice: Subject to any disclaimer, the term of this patent is extended or adjusted under 35 U.S.C. 154(b) by 333 days.

(21) Appl. No.: 10/407,158

(22) Filed: Apr. 3, 2003

(65) Prior Publication Data

US 2004/0007854 A1     Jan. 15, 2004

Related U.S. Application Data

(60) Provisional application No. 60/371,308, filed on Apr. 10, 2002, provisional application No. 60/371,480, filed on Apr. 10, 2002, provisional application No. 60/371,076, filed on Apr. 9, 2002.

(51) Int. Cl.
*B60R 21/16*     (2006.01)
*B60R 21/20*     (2006.01)

(52) U.S. Cl. .................... 280/728.2; 280/731
(58) Field of Classification Search ............... 280/731, 280/728.2
See application file for complete search history.

(56) References Cited

U.S. PATENT DOCUMENTS

| | | | |
|---|---|---|---|
| 5,320,379 A * | 6/1994 | Burnard et al. ......... | 280/728.2 |
| 5,409,256 A * | 4/1995 | Gordon et al. ........... | 280/728.2 |
| 5,470,100 A * | 11/1995 | Gordon .................... | 280/728.2 |
| 5,520,409 A * | 5/1996 | Saderholm ............... | 280/728.2 |
| 5,547,213 A * | 8/1996 | Lang et al. ............... | 280/728.2 |
| 5,553,886 A * | 9/1996 | Gunn et al. ............... | 280/728.2 |
| 5,613,700 A * | 3/1997 | Hiramitsu et al. ....... | 280/728.2 |
| 5,615,907 A * | 4/1997 | Stanger ................... | 280/728.2 |
| 5,658,008 A * | 8/1997 | Herrmann et al. ....... | 280/728.2 |
| 6,135,492 A | 10/2000 | Zimmerbeutel et al. | |
| 6,286,858 B1 | 9/2001 | Shepherd et al. | |
| 6,328,332 B1* | 12/2001 | Schutz .................... | 280/728.2 |
| 6,361,064 B1 | 3/2002 | Hopf et al. | |
| 6,422,589 B1 | 7/2002 | Ostermann et al. | |
| 6,565,113 B1 | 5/2003 | Kassman et al. | |
| 6,626,455 B1 | 9/2003 | Webber et al. | |
| 2003/0116948 A1* | 6/2003 | Back et al. ................ | 280/731 |

FOREIGN PATENT DOCUMENTS

DE     19538594 A1 *    4/1994

\* cited by examiner

*Primary Examiner*—Ruth Ilan
(74) *Attorney, Agent, or Firm*—Scott A. McBain

(57) ABSTRACT

An airbag module includes a gas generator comprising at least one snap connection element and a gas generator holder for the gas generator which has a complementary snap connection element to the snap connection element of the gas generator, with the snap connection elements being formed such that the gas generator can be fixed to the gas generator holder by means of a snap connection.

6 Claims, 5 Drawing Sheets

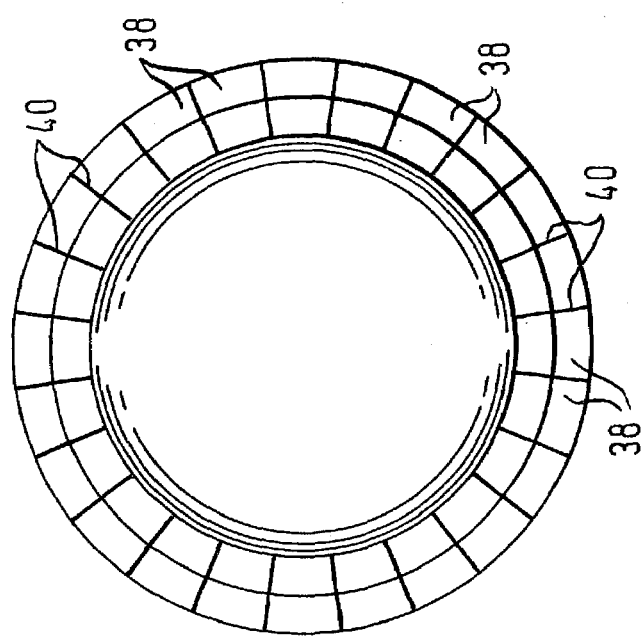
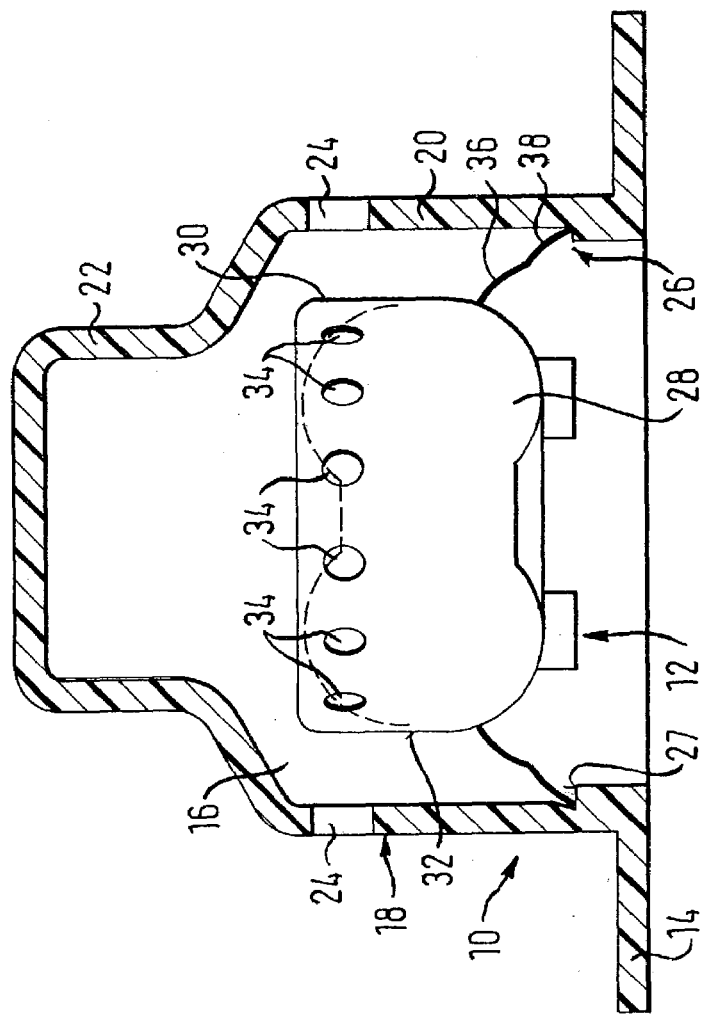

AIRBAG MODULE AND A METHOD FOR THE ATTACHING OF A GAS GENERATOR TO A GAS GENERATOR HOLDER

This application claims priority from prior provisional application No. 60/371,076 filed, Apr. 9, 2002 and prior provisional application No. 60/371,308, filed Apr. 10, 2002 and prior provisional application No. 60/371,480 filed Apr. 10, 2002, all abandoned.

TECHNICAL FIELD

The present invention relates to an airbag module and to a method for the attaching of a gas generator to a gas generator holder of an airbag module.

BACKGROUND OF THE INVENTION

Airbags are provided in many motor vehicles in order to protect the occupants of the motor vehicle in the event of a collision of the motor vehicle with an obstacle from striking objects in the passenger compartment or boundaries of the passenger compartment without cushioning.

For this purpose, a conventional airbag has an airbag module which includes a gas generator and a folded airbag having an opening called an airbag mouth. In the event of a collision, gas of the gas generator is led through the airbag mouth into the airbag, whereby the airbag is inflated and unfolded.

In this connection, the gas generator is attached to a gas generator holder of the airbag module by means of separate attachment means such as bolts, pins or screws.

This kind of attachment, however, has the disadvantage that the number of required installation steps on the installation of the gas generator to the airbag module increases with the number of the attachment elements and results in a high production effort.

SUMMARY OF THE INVENTION

It is therefore the underlying object of the present invention to provide an airbag module in which a gas generator can be attached to a gas generator holder of the airbag module in a simple manner and to provide a method with which a gas generator can be simply fixed to a gas generator holder of an airbag module.

The object is satisfied by an airbag module that includes a gas generator secured to a gas generator holder by means of a snap connection.

An airbag module in accordance with the invention includes a gas generator having at least one snap connection element and a gas generator holder for the gas generator which has a snap connection element complementary to the snap connection element of the gas generator, with the snap connection elements being designed such that the gas generator can be fixed to the gas generator holder by means of a snap connection.

The object is further satisfied by a method for the securing of a gas generator to a gas generator holder by a snap connection.

In the method in accordance with the invention for the fixing of a gas generator having a snap connection element to a gas generator holder having a snap connection element complementary to the snap connection element of the gas generator, the gas generator is snapped into the gas generator holder while forming a snap connection.

The gas generator of the airbag module in accordance with the invention can in particular be fixed to the gas generator holder of the airbag module in accordance with the invention using the method in accordance with the invention.

The gas generator and the gas generator holder have a snap connection element and a complementary snap connection element for the attachment, with at least one of the snap connection element and the complementary snap connection element being formed as a resilient snap element, while the other snap connection element can be formed either likewise as a resilient snap element or as a substantially rigid element for a snap connection, for example in the form of a cut-out or of a protrusion or of an undercut.

A simple installation of the gas generator is achieved by the snapping in of the gas generator into the gas generator holder without separate, further attachment elements which have to be handled individually such as screws or bolts and can furthermore also be carried out faster. Finally, the costs for the attachment means are saved.

Further developments and preferred embodiments of the invention are described in the claims, in the description and in the drawings.

The gas generator can be exposed to substantial acceleration forces and/or deceleration forces in the operation of a motor vehicle fitted with the airbag module, in particular in the event of an accident. It is therefore preferred for the snap connection elements to be formed as latching elements. Such a snap connection formed as a latching connection can in particular be designed such that it cannot be detached by the forces on the gas generator and on the gas generator holder in the operation of a motor vehicle and/or without tools. A secure attachment of the gas generator to the gas generator holder is thus achieved.

It is preferred for the gas generator to have a pressure container and a mount fixedly connected thereto and for the snap connection element to be formed at the mount. The pressure container can contain a substance which develops a gas on activation of the gas generator or it can contain a compressed gas which is expanded on activation of the gas generator. The mount can, for example, be welded to the gas generator. In this manner, a conventional pressure container can be used so that only the mount has to be designed for the snap connection. Furthermore, the pressure container can generally be designed independently of the position and design of the snap connection element, and thus more simply.

It is then particularly preferred for the mount, as a snap connection element, to have a resilient tongue which is made in one piece with the mount. This is in particular advantageous when the mount is formed from a thin material, in particular from a sheet metal, such that the manufacture is greatly simplified and, simultaneously, a high strength is achieved. The tone can in particular be formed by punching and subsequent bending when sheet metals are used.

It is furthermore in particular preferred for the mount to have a peripheral side wall which ends in a plurality of resilient tongues which in particular form a crown. A more uniform distribution of the holding forces around the peripheral side wall is hereby achieved. Moreover, the tongues can be manufactured simply by punching when the mount is shaped from a metal sheet. If the tongues form a crown, slots, in particular radially extending slots, can be formed between the tongues.

It is particularly preferred in this connection for the resilient tongues to project radially over the remaining side wall in the relaxed state. The gas generator can be easily inserted into the gas generator holder by this design, with the tongue or the tongues being tensioned without the use of tools.

It is further preferred in this connection for the gas generator holder to include a hollow space for the receiving of the gas generator and for the complementary snap connection element to be formed as an undercut in or on an inner wall of the hollow space. Such an undercut can in particular be manufactured very easily in particular with a gas generator holder of injection molded plastic or a die cast. An undercut can in particular serve as a complementary snap connection element for a plurality of snap connection elements or tongues if they extend over sufficiently long a section.

It is particularly preferred for the mount to be formed in pot-like shape. It can thus have a very high stability even with a lower material thickness of a wall of the mount such that material and weight can be saved. Furthermore, the pressure container can be peripheral and be closed by a further side such that it can be held in a particularly safe and protected manner in the mount. Moreover, the mount can also be used for the leading of gas which is discharged from the pressure container on an activation of the gas generator.

It is furthermore preferred for at least two resilient tongues, resilient at least in one respective radial direction, to be provided and for a guide element to be formed at the gas generator holder which engages between the tongues on the installation of the gas generator to the gas generator holder. The guide element can in particular be a nose or a rib which is arranged on the gas generator holder. A very simple installation of the gas generator is made possible by the guiding of the gas generator made possible in this manner before and/or on the snapping in, with which the snap connection elements or the tongues and the complementary snap connections can be simultaneously aligned to one another. Moreover, the gas generator can also be easily aligned with respect to the gas generator holder, which is in particular of importance when gas discharge openings in the gas generator have to be aligned to gas discharge openings in a diffuser with which gas discharged from the gas generator can be distributed in an airbag of the airbag module.

After a gas triggering or for the disposal of the airbag module, the gas generator must be removed from the gas generator holder. It is therefore preferred for at least one snap-out cut-out to be provided in the airbag by which the snap connection element and/or the complementary snap connection element can be reached for the release of the snap connection without any other dismantling of the airbag module. An element of the snap connection element and of the complementary snap connection element, which is made resilient, can for example be brought into a position in which the snap connection is released through this snap-out cut-out which can be formed, for example, as a bulge or as an opening. All resilient snap connection elements and/or all complementary resilient snap connection elements can preferably be reached via one or more snap-out cut-outs for the release of the snap connection. A corresponding tool can in particular be used for this purpose. The gas generator can then easily be removed from the gas generator holder without individual screws having to be released.

It is preferred for the gas generator holder to be formed by a base body of the airbag module. This base body, preferably made as one piece, can in particular simultaneously serve for the attachment of the airbag module and/or for the holding of an airbag of the airbag module.

It is furthermore preferred for the gas generator holder to be formed by a diffuser of the airbag module. A particularly compact design of the airbag modules in accordance with the invention thus results since gas of the gas generator can be distributed directly into the airbag of the airbag module through the gas generator holder.

The invention can be used with any desired airbag modules, that is in particular with such modules having conventional or toroidal airbags. Furthermore, the airbag module can, for example, be an airbag module for a driver airbag, a passenger airbag or a side airbag.

BRIEF DESCRIPTION OF THE DRAWINGS

The present invention will now be further explained by way of example with reference to the drawings, in which:

FIG. 1 is a schematic, partly sectional view through a base body and a gas generator of an airbag module in accordance with a first preferred embodiment of the invention;

FIG. 2 is a schematic plan view of the gas generator in FIG. 1;

DESCRIPTION OF THE PREFERRED EMBODIMENT

Figure 3:
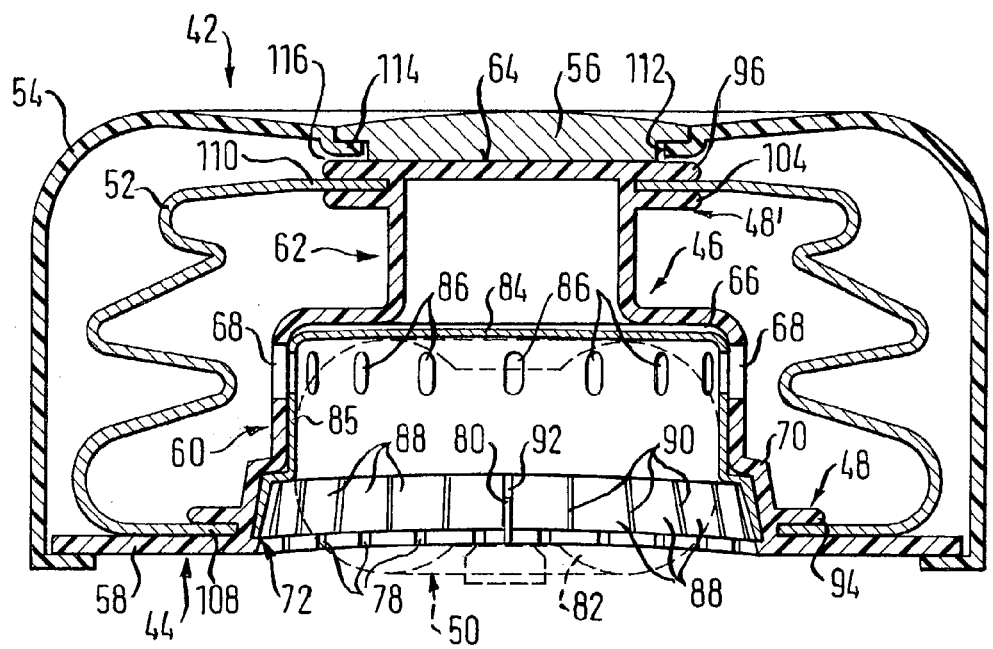
FIG. 3 is a schematic sectional view through an airbag module in accordance with a second preferred embodiment of the invention.

A base body 10 and a gas generator 12 of an airbag module, not shown in full, in accordance with a first preferred embodiment of the invention are shown in FIG. 1.

The base body 10 has a base region 14 for attachment and a gas generator holder 18 formed in one piece therewith and bounding a hollow space 16.

The rotationally symmetrical gas generator holder 18 includes a hollow cylindrical gas generator holder 20 and a likewise hollow cylindrical terminating section 22 which has reduced interior and exterior diameters with respect to the gas generator holder 20 and at which the end opposite the gas generator holder 20 is closed.

First gas discharge openings 24 are formed peripherally in the gas generator holder 20.

A peripheral undercut 26 is formed at an end of the gas generator holder 20 on the base side, in its inner wall, and has a latching surface 27 extending substantially parallel to the base region 14.

The gas generator 12 includes a conventional pressure container 28 which contains a substance for the gas development and a pot-like shaped mount 30 in which the pressure container 28 is welded.

The mount 30, which is made of a sheet metal, has multiple gas discharge openings 34 in a peripheral side wall 32 and gas can be led through these from the pressure container 28 to the first discharge openings 24.

A free rim of the cylindrical side wall 32 has a flared section 36 which merges while forming a kink into a crown of resilient tongues 38 formed in a peripheral manner, separated from one another by radially extending punched slots 40 (cf. FIG. 2) and projecting radially over the remaining side wall 32.

The resilient tongues 38 engage into the undercut 26 such that the gas generator 12 is held in the base body 10.

For the installation, the gas generator 12 is simply inserted into the opening of the hollow space 16, with the resilient tongues 38 being pressed radially inwardly as snap elements. On passing the latching surface 27, the tongues snap into the undercut 26 serving as complementary snap connection elements for the tongues 38 such that the gas generator 12 is snapped in or latched in the gas generator holder 18.

Due to the alignment of the latching surface 27, the gas generator 12 cannot or can no longer be removed without pressing together the tongues 38.

In FIG. 3, an airbag module 42 in accordance with a second preferred embodiment of the invention has a base body 44 with an airbag holder 46 which is formed in one piece thereon and which has airbag holder sections 48 and 48', a gas generator 50, an airbag 52, a cover 54 and a hub cover 56.

The substantially rotationally symmetrical base body 44, made in one piece as a die cast part of polyamide, serves among other things for the attachment of the airbag module 42. In the proximity of a base 58 formed like a flange, it has a wide, substantially hollow cylindrical gas generator holder 60 which adjoins a hollow cylindrical terminal section 62 with smaller interior and exterior diameters. The terminal section 62 is closed at its free end, with the hub cover 56 being held at an arising terminal surface 64.

The gas generator holder 60 therefore has a hollow space 66 in which the gas generator 50 is arranged.

First gas discharge openings 68 are formed in a circumferential manner in the gas generator holder 60 and gas of the gas generator 50 can be led through these into the airbag 52 such that the gas generator holder simultaneously serves as a diffuser.

An end of the gas generator holder 60 at the base side is widened in a truncated cone shape while forming a shoulder 70.

Figure 4:
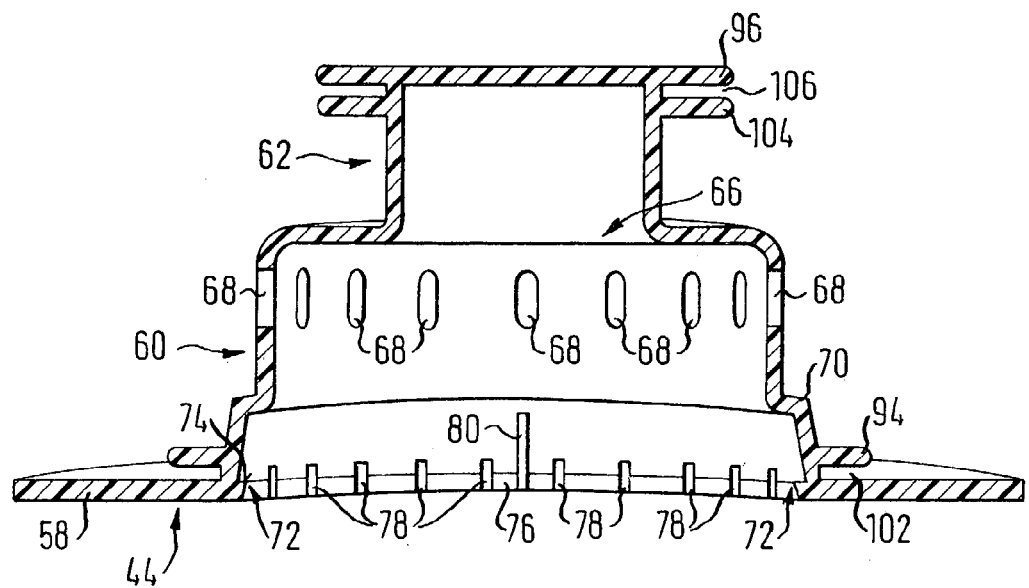
FIG. 4 is a schematic sectional view through a base body of the airbag module in FIG. 3.

A peripheral undercut 72 with a latching surface 74 arranged parallel to the base 58 is formed at the end of an inner wall of the gas generator holder 60 at the base side (cf. FIG. 4).

Figure 5:
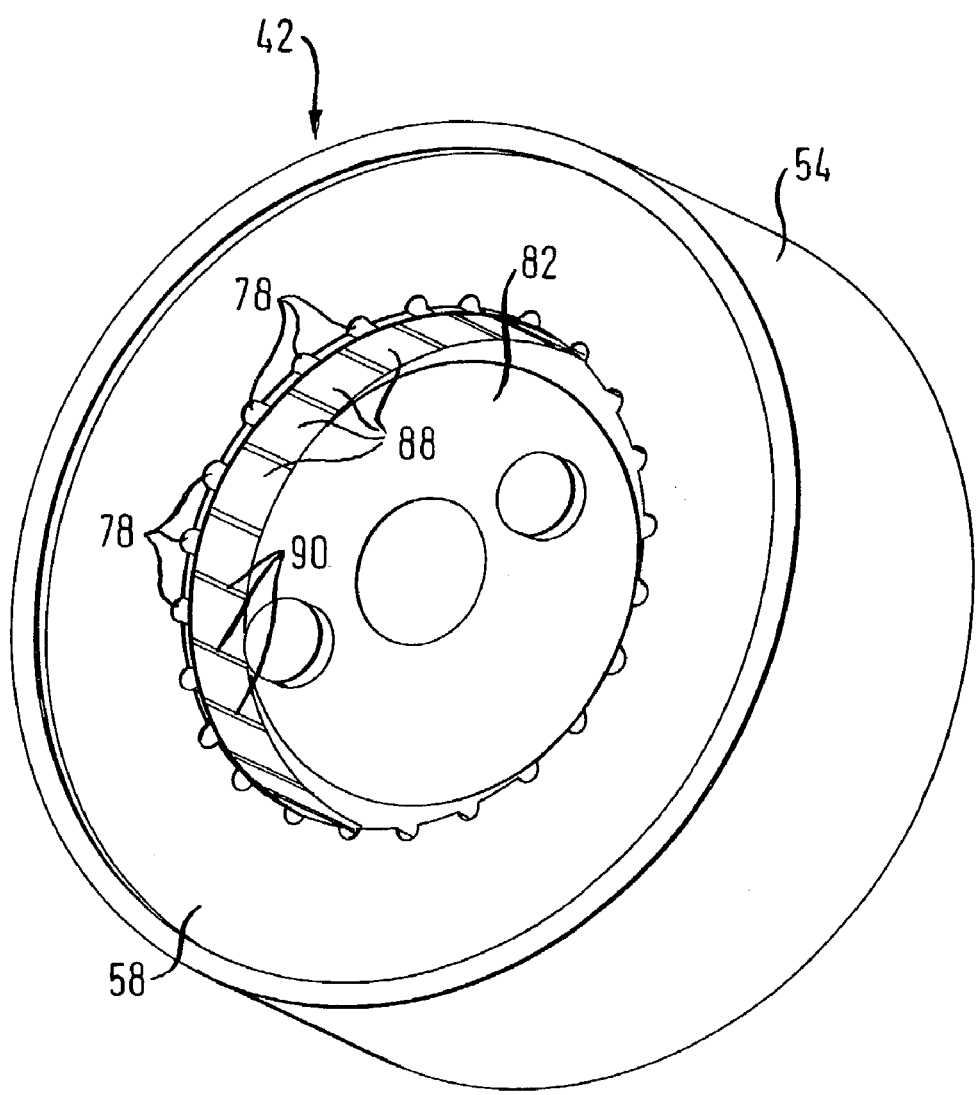
FIG. 5 is a schematic perspective view of the airbag module in FIG. 3 from a direction at the gas generator side.

In a strip 76 which is formed by the latching surface 74 and the lower surface of the base 58 and which forms the undercut 72 and in an adjacent region of the inner wall of the gas generator holder 60, snap-out cut-outs 78 are formed at pre-determined angular intervals which extend through the strip 76 and through part of the gas generator wall up to and behind the undercut 72 (cf. FIGS. 3, 4 and 5).

As can be recognized in FIG. 4, a rib 80 is formed between two of these snap-out cut-outs which extends parallel to a rotational axis of the gas generator holder 60 and beyond the undercut 72 into the proximity of the shoulder 70.

The gas generator 50 has a conventional pressure container 82 which contains means to discharge gas for the inflation of the airbag 52. The pressure container 82 is welded into a pot-like mount 84 made from a metal sheet.

The mount 84 has a peripheral, cylindrical side wall 85 in which second gas discharge openings 86 are formed which coincide with the first gas discharge openings 68 of the gas generator holder 60.

A rim region of the side wall 85 is kinked and continues in tongues arranged like a crown and outwardly resilient of which, for reasons of clarity, only some are provided with the reference numeral 88 in the Figures. The tongues 88 are produced by punching and are therefore separated from one another by slots 90. A slot 92 has a larger width than the other slots 90.

In the untensioned state, when the gas generator 50 is not inserted into the base body 44, the tongues 88 project radially beyond the side wall 85.

If the gas generator 50 is, as shown in FIG. 3, inserted into the gas generator holder 60, the tongues 88 engage into the undercut 72 in the gas generator holder 60 and contact the truncated cone-shaped section of the inner wall of the gas generator holder 60 under tension.

The number and the angular spacing of the tongues 88 corresponds to the angular spacing of the snap-out cut-outs 78 which are designed with respect to the tongues 88 such that it is possible to engage behind the tongues 88 with a removal tool through the snap-out cut-outs 78.

The rib 80 is so wide that it can be inserted into the wider slot 92 between the tongues 88, but not into the narrower slots 90. The rib 80 is furthermore arranged such that the snap-out cut-outs 78 are arranged approximately in the center of the tongues 88, on the one hand, and the first and second gas discharge openings 68 and 86 coincide, on the other hand, when the gas generator 50 is inserted into the base body 44.

The gas generator 18 is thus held between the undercut 72 and the shoulder 70.

Figure 6:
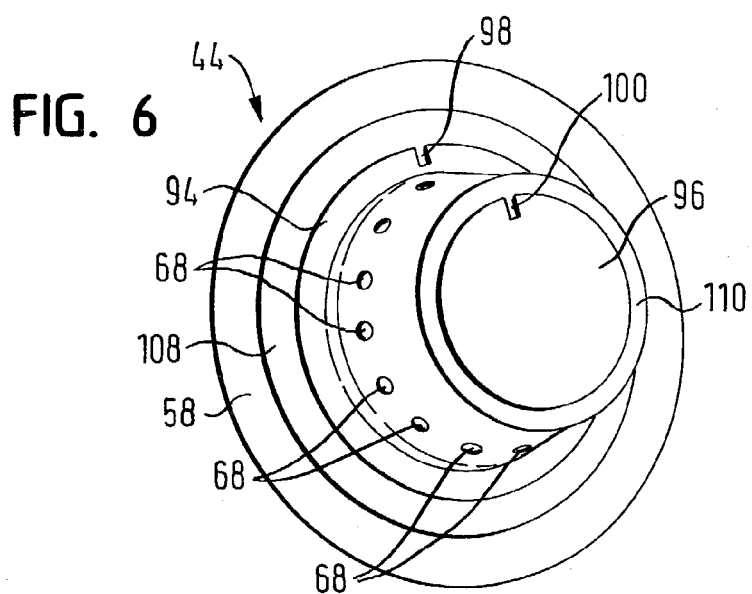
FIG. 6 is a perspective view of a base body of the airbag module in FIG. 3 with an airbag holder and of rims of an airbag of the airbag module in FIG. 3.
Figure 7:
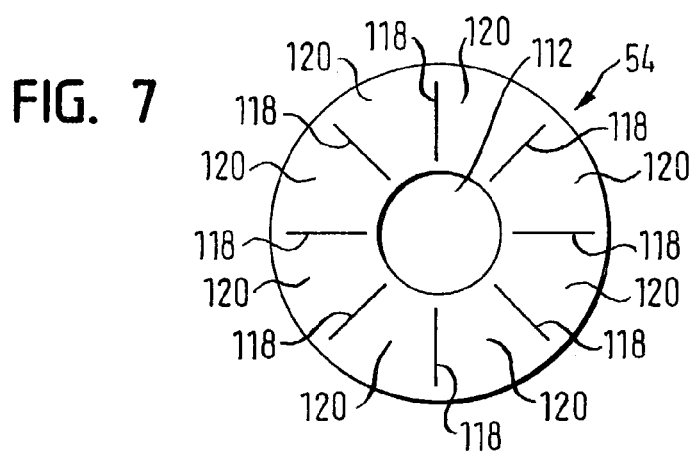
FIG. 7 is a plan view of a cover and hub cover of the airbag module in FIG. 3.

Projections 94 and 96 having a circular peripheral contour are formed above the base 58 and coincidental to the terminal surface 64, run around the gas generator holder 60 and the terminal section 62 and each have the shape of a flange. Radially extending recesses 98 and 100 in the form of slots which are orthogonal to the surface of the projections 94 and 96, pass through these and in each case reach radially up to the outer periphery of the gas generator holder 60 or of the terminal section 62 (cf. FIG. 6) are formed in the projections 94 and 96.

The projection 94 is arranged so closely to the base 58 that the base 58 formed close to the gas generator holder 60 as a peripheral flange forms a groove 102 of pre-determined width with the projection 94.

On the side of the projection 96 facing the gas generator 50, a circumferential, complementary projection 104 formed like a flange is arranged such that the projection 96 and the complementary projection 104 form a groove 106 whose width is the same as that of the groove 102.

The folded conventional toroidal airbag 52 shown only very schematically in FIG. 1 has two airbag mouths which each have a rim 108 and 110 respectively. The rims 108 and 110 of the airbag mounts are arranged in the grooves 102 and 106 whose pre-determined widths correspond to the thicknesses of the rims 108 and 110 respectively and thus respectively engage behind projections 94 and 96 such that the airbag mouths are held behind the projections 94 and 96, and thus at the airbag holder sections 48 and 48', on the unfolding of the airbag 52 by gas of the gas generator 50.

The diameters of the gas generator holder 60, of the terminal section 62, of the corresponding projections 94 and 96 and of the corresponding airbag mouths and the depths of the cut-outs 98 and 100 are selected such that the rims 108 and 110 of the airbag 52 can be inserted into the cut-outs 98 and 100 and can be moved behind the projections 94 and 96 by rotation through 360°.

The cover 54 of polyamide is formed like a hood and has a circular opening 112 at the center of the hood whose cranked rim 114 engages into a groove 116 formed by the hub cover 54 and the projection 96. Radially extending desired breaking lines 118 are formed, starting radially from the opening 112, in the section of the cover 54 extending substantially parallel to the base 58 (cf. FIG. 3). On an unfolding of the airbag 52, the rim 114 is ripped out of the groove 116 and cover tongues 120 are formed and bent radially outwardly while breaking the desired breaking lines 118 such that an opening is created through which the airbag 52 can further unfold.

To attach the gas generator 50 in the base body 44, the gas generator 50 is simply inserted into the opening of the gas generator holder 60, with the rib 80 leadingly engaging into the slot 92 and the obliquely radially projecting tongues 88 being pressed inwardly.

After passing the latching surface 74, the tongues 88 latch in the undercut 72 such that the gas generator 50 can no longer be removed by normal forces occurring in operation.

Figure 8:
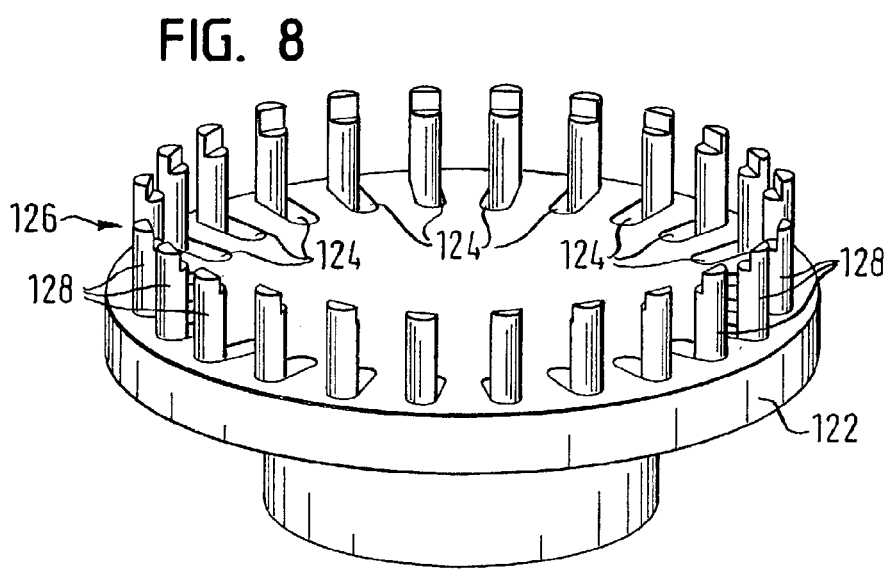
FIG. 8 is a schematic, partly perspective view of a removal tool for the removal of the gas generator from the airbag module in FIG. 3.
Figure 9:
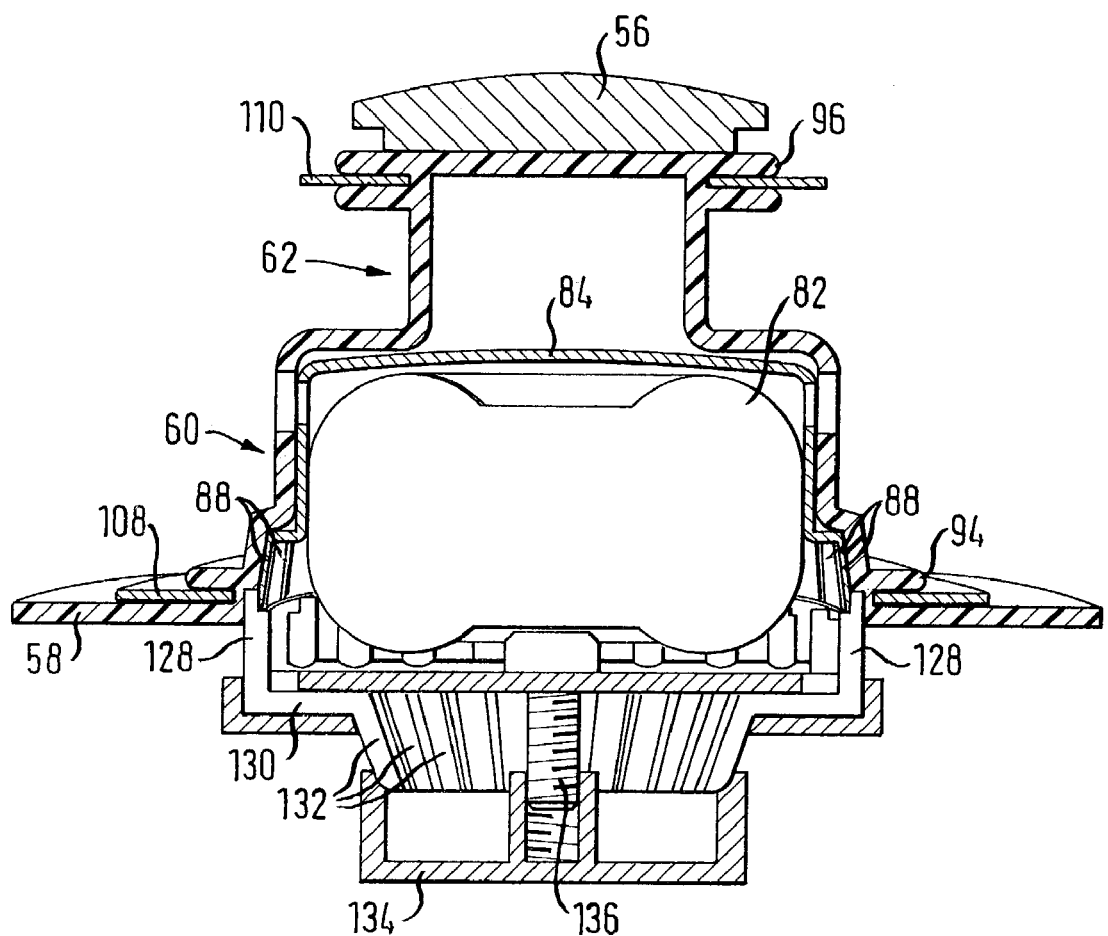
FIG. 9 is a schematic, partly sectional view through the airbag module in FIG. 3 with the removal tool employed.

A removal tool can, for example, be used for the removal of the gas generator 50 from the base body 44 and is shown schematically and partly in FIGS. 8 and 9.

In a guide body 122 formed from two plates and having a circular cross-section, a number of radially extending elongate apertures 124 are formed which correspond to the number of snap-out cut-outs 78 and through which twice-kinked cylindrical grippers 126 are guided. The outer ends of the elongate apertures 124 are arranged on a circle whose diameter corresponds to the diameter of the circle on which the snap-out cut-outs 78 are arranged.

The grippers 126 each have cut-outs at their grip ends 128 which are so large that the remaining, approximately, semi-circular end sections of the grippers 126 can be guided through the snap-out cut-outs 78 behind the tongues 88 and then contact these.

The grippers 126 are first, starting from grip ends 128, kinked at a right angle, whereby radially extending connection sections 130 are formed. These are guided in the guide body 122.

The connection sections 130 are continued after the second kink in tension sections 132 which run radially obliquely toward one another and are arranged to lie outside the guide body 122 on a cone overall (cf. FIG. 9).

The tension sections 130 end in a pot 134 which is connected to the guide body 122 via a central screw connection 136.

The inside diameter of the pot 134, the length of the connection sections 130 and the length of the elongate apertures 124 are selected such that, after insertion of the grip ends 128 of the grippers 126 into the snap-out cut-outs 78 with an almost released screw connection 136, the pot 134 is moved upwardly by a screw movement of the pot 134 and the tension sections 132 are pulled radially inwardly from the pot rim. The grip ends 128 are thereby pulled radially inwardly such that the tongues 88 are moved out of the undercut 72. The gas generator 50 can then be removed from the opening of the base body 44.

The invention claimed is:

1. An airbag module comprising
a gas generator holder comprising a base body including a base body wall defining a space and comprising a base having an opening, said opening being bordered by a latching surface; and
a gas generator received in said space, said gas generator comprising a pressure container and a mount, said mount including a peripheral side wall extending along the base body wall and ending in a plurality of resilient tongues arranged in a crown and having ends engaging the latching surface, thereby forming a snap connection securing said gas generator within said gas generator holder.

2. An airbag module in accordance with claim 1, wherein the latching surface faces the space.

3. An airbag module in accordance with claim 1, wherein the tongues are spaced apart by slots.

4. An airbag module in accordance with claim 1, wherein the plurality of tongues comprises two tongues spaced apart by a slot, and wherein the gas generator holder comprises a guide rib received in said slot.

5. An airbag module in accordance with claim 1, wherein the base body further comprises a shoulder spaced apart from the latching surface, and wherein the tongues are received between the latching surface and the shoulder.

6. An airbag module in accordance with claim 1, wherein the base body further comprises a cut-outs underlying said tongues and adapted to provide access for a removal tool.

* * * * *